United States Patent Office 3,479,331
Patented Nov. 18, 1969

3,479,331
CATALYTIC PROCESS FOR PREPARING A HIGH MOLECULAR WEIGHT CIS-1,4-POLYISOPRENE
Kan Mori, Taro Suminoe, Tamotu Yamazaki, Tunezo Ishikawa, and Akira Kogure, Yokkaichi-shi, Japan, assignors to Japan Synthetic Rubber Co., Ltd., Tokyo, Japan, a corporation of Japan
No Drawing. Filed Dec. 18, 1967, Ser. No. 691,161
Claims priority, application Japan, Dec. 26, 1966, 41/84,450
Int. Cl. C08d 1/14
U.S. Cl. 260—94.3      4 Claims

ABSTRACT OF THE DISCLOSURE

High molecular weight cis-1, 4-polyisoprene is produced by contacting isoprene in a hydrocarbon solvent with a catalyst obtained by admixing (A) a titanium tetrahalide, (B) a complex of boron trifluoride with a phenol, and (C) a trialkylaluminium. Preferred catalyst is prepared by adding (A), optionally in the presence of isoprene, to a reaction mixture of (B) with (C), the proportions of the three components being such that Ti:Al is 1:05 to 1:10, and Al:B is 3:1 to 15:1.

---

This invention relates to a process for the preparation of polyisoprene. More particularly, the invention relates to a process for the preparation of a cis-1,4-polyisoprene having an extremely high molecular weight and a widely varying gel content, with the use of a novel catalyst which has a high polymerizing activity.

It is well known that the molecular weight of natural rubber or cis-1,4-polyisoprene having substantially the same molecular structure as natural rubber (hereinafter referred to simply as polyisoprene) is reduced when milled on roll or in Banbury mixer. The polyisoprene as raw rubber for practical use must have the molecular weight approximately to that of masticated natural rubber (which is 4–5 when expressed by an intrinsic viscosity $[\eta]$). From an economical standpoint, preparation of oil-extended polyisoprene is also desirable. In this case, however, the base polymer must be of a sufficient high molecular weight to secure the economical advantage. Therefore, in the preparation of polyisoprene, high molecular weight of the product polymer is a critical requirement.

The gel content of the product polymer is another important factor. It is a common knowledge, in general, that the gel content of the elastomer affects to a great degree the processability of the elastomer and also the properties of the vulcanized product. This also applies to the polyisoprene. Therefore, if the gel content of the polyisoprene can be freely controlled from a very minimum to a substantial amount, a wide variety of the vulcanized products suitable for different usages may be conveniently obtained.

The preparation of a high molecular weight polyisoprene, however, is very difficult by using titanium tetrachloride-trialkyl-aluminiu m catalyst which is known for its excellent catalytic activity for polyisoprene formation, without lowering the polymerizing activity of the catalyst. Also with the use of this type of catalyst, gel content of the product is invariably high (e.g., E. Schoenberg et al., Advances in Chemistry Series 52, p. 6, American Chemical Society, Washington, D.C., 1966).

It has now been found that a novel catalyst, which is highly active in the polymerization of isoprene and is capable of producing a high molecular weight cis-1,4-polyisoprene, can be obtained with a combination of a titanium tetrahalide, a complex of boron trifluoride with a phenol, and a trialkylaluminium. It has also been found that some of the novel catalysts disclosed in this specification can produce substantially gel-free polymers.

Accordingly, the present invention provides a process for the preparation of a high molecular weight cis-1,4-polyisoprene, which comprises contacting isoprene in a hydrocarbon solvent with a catalyst which is obtained by admixing (A) a titanium tetrahalide, (B) a complex of boron trifluoride with a phenol and (C) a trialkylaluminium.

As the catalyst component (A), any of tetrachloride, tetrabromide, and tetraiodide of titanium can be used. However, titanium tetrachloride is the most preferred.

The boron trifluoride-phenol complex, which is the catalyst component (B), can be prepared by passing boron trifluoride gas through the phenol. As for the phenol, mononucleus monohydric phenols such as phenol and metacresol are preferred.

The catalyst component (C) is selected from the trialkylaluminiums represented by a general formula AlRR'R'' (in which R, R', and R'' each stands for an alkyl group, which may be the same or different. The type of the alkyl group is not critical, which may be straight or branched chain. Alkyl groups having 1–20 carbon atoms are preferred, and those having 1–8 carbon atoms are the most preferred. Preferred trialkylaluminiums include: trimethylaluminium, triethylaluminium, tripropylaluminium, tri-n-butylaluminium triisobutylaluminium, trihexylaluminium, and trioctylaluminium.

The catalyst of this invention can be prepared by mixing the above three components, (A), (B) and (C) under an inert gas atmosphere, preferably in a hydrocarbon solvent. It is preferred that the components (B) and (C) are first mixed and then the component (A) is added thereto. The catalyst may also be prepared by mixing the three components in the presence of a part or whole of the isoprene to be polymerized. In order to obtain both a high molecular weight polymer and an extremely high yield, it is recommended to mix the three catalyst components in the absence of isoprene, or in the presence of at a maximum of 10 molar times the component (A) of the isoprene, and thereafter to age the mixture. The aging time differs depending on the aging temperature. Usually shorter aging time is sufficient under higher temperature. For example, at 10° C. approximately an hour's aging is preferred, but at 20° C. or higher, 30 minutes' aging is sufficient.

The ratio between components (B) and (C) differs depending on the quantity of component (A). Generally speaking, however, (C)/(B) in terms of molar ratio of 3–15 is preferred, inter alia, 4–10. The (C)/(A) ratio differs depending on the quantity of component (B), but normally the preferred (C)/(A) molar ratio ranges 0.5–10. For instance, if the molar ratio of (C)/(B) is 5, the preferred (C)/(A) molar ratio is 1–5.

The polymerization reaction can be performed by contacting the catalyst with isoprene in a hydrocarbon solvent under an inert gas atmosphere. As for the hydrocarbon solvent, aliphatic hydrocarbons such as pentane, hexane and heptane; cycloaliphatic hydrocarbons such as cyclopentane and cyclohexane; and aromatic hydrocarbons such as benzene and toluene, may be used. As for the inert gas, nitrogen, argon, etc. may be used, but nitrogen is preferred for economical reasons. The polymerization temperature may vary over a considerable wide range, e.g., 0°–100° C., the preferred range being 10°–50° C. The polymerization pressure is not critical, so far as it is sufficient to maintain the reaction mixture in a liquid phase. The suitable amount of the catalyst required is normally within the range of 0.0005–0.01 mol based on the amount of titanium per one mol of isoprene, the preferred range being approximately 0.001–0.005 mol.

When the polymerization reaction has proceeded to the desired stage, the reaction can be terminated by the accepted practice. Then the product polymer is separated, washed and dried by a conventional method to obtain the polyisoprene.

The high molecular weight polyisoprene obtained by the present process will possess a high cis-1,4 structure, having a cis content of normally no less than 96%, or under preferred polymerization conditions 98% or more, as determined with infrared absorption spectrum analysis.

Hereinafter the invention will be explained with reference to the examples, which, however, are by no means intended to be limitative. In the examples, the boron trifluoride-phenol complex employed was a red or reddish purple, slightly viscous liquid having a melting point of −3.5° C., and contains 26.5±0.5% by weight of $BF_3$. This corresponds to $BF_3 \cdot 2C_6H_5OH$.

The intrinsic viscosity $[\eta]$ of each polyisoprene was measured in toluene at 30° C.

The gel content of each product was determined as follows. A 0.2% by weight solution of the product in toluene was filtered through a 200-mesh stainless steel screen, and the solid content remaining on the screen was measured.

The micro-structure of the polymer was determined by measuring the infrared absorption spectrum of the polymer solution in carbon disulfide, and calculating the structure from the measured result in accordance with Richardson's method [J. Polymer Sci., 10, 353 (1953)].

EXAMPLES 1–6

A glass Schlenk-type ampule of 100 ml. capacity was charged with 30 ml. of n-hexane, 6.8 g. of isoprene, a triethylaluminium solution in n-hexane (concentration: 0.5 mol/l.), a boron trifluoride-phenol complex solution in toluene (concentration: 0.2 mol/l.) and 1 ml. of titanium tetrachloride solution in hexane (concentration: 0.5 mol/l.). The components were introduced into the ampule in the order stated, at room temperature (25° C.) while vigorous stirring. The hexane solution of triethylaluminium and the toluene solution of the boron trifluoride-phenol complex were charged in such amounts that the Al/B mol ratio was constantly 5, while the Al/Ti molar ratio varied from 1.0–3.5 as indicated in Table 1 below. Finally the balance amount of n-hexane was added to make the total amount of the mixture 50 ml. The foregoing operations were all performed under the atmosphere of nitrogen gas. The ampule was immediately melt-sealed and kept in a rotary reaction bath for 5 hours at 30° C. After completion of the reaction, the reaction mixture was poured into methanol which contained 2,6-di-tert-butyl-phenol as an antioxidant, in order to inactivate the catalyst and precipitate the polymer. The polymer was vacuum dried at 40° C. for 24 hours. The results are shown in Table 1.

TABLE 1

| | Al/Ti (molar ratio) | Yield (percent) | $[\eta]$ |
|---|---|---|---|
| Example Number: | | | |
| 1 | 1.0 | 55 | 3.9 |
| 2 | 1.5 | 74 | 4.2 |
| 3 | 2.0 | 77 | 4.8 |
| 4 | 2.5 | 72 | 4.5 |
| 5 | 3.0 | 66 | 4.7 |
| 6 | 3.5 | 60 | 3.9 |

For comparison, a series of control experiments were run in the similar manner to Examples 1–6, except that the use of the boron trifluoride-phenol complex was omitted. The Al/Ti molar ratios were also varied for each run. The best result was obtained when Al/Ti=1, in which the yield was 63% and the product polymer had an $[\eta]$ of 2.7.

From the foregoing results, it can be understood that when the catalyst of this invention is used, the polymerizing activity of the catalyst and the molecular weight of the product polymer shown no substantial change over a wide range of Al/Ti molar ratio in the catalyst, e.g., from 1.5 to 3.0. This is indeed surprising when the fact is considered that for the conventional titanium tetrachloride-trialkylaluminium catalyst system, the Al/Ti molar ratio therein must be controlled within a very narrow range of, say, 0.8–1.3 to exhibit a high activity.

EXAMPLES 7 AND 8

In these examples, the order of adding the catalyst and monomer was varied to determine its significance. In Example 7, the catalyst components were mixed in the presence of entire monomer to be polymerized. Whereas in Example 8, the components were mixed in advance to form the catalyst, and to which the monomer was added.

The polymerization was performed in a 100-ml. glass Schlenk-type ampule. First 35 ml. of hexane was charged, and in Example 7, the components were added in the following order: isoprene, triethyl-aluminium, boron trifluoride-phenol complex, and titanium tetrachloride. In Example 8, the order was as follows: triethylaluminium, boron trifluoride-phenol complex, titanium tetrachloride, and isoprene. The ampule was melt-sealed and kept in a rotary reaction bath at 10° C. for 5 hours. The amounts of the components employed were as follows: isoprene, 6.8 g.; triethylaluminium, 1.25 millimols; boron trifluoride-phenol complex, 0.25 millimol; and titanium tetrachloride, 0.5 millimol. The post-treatments following the polymerization reaction were similar to those in Examples 1–6. The results are shown hereinbelow:

| | Yield (percent) | $[\eta]$ | cis-1,4 content (percent) |
|---|---|---|---|
| Example Number: | | | |
| 7 | 35 | 5.5 | 98 |
| 8 | 52 | 5.2 | 98 |

EXAMPLE 9

In this example, the polymerization reaction was performed in a similar manner as Examples 1–6, except that the proportions of the catalyst components were selected as Al/B=4, and Al/Ti=2. The amounts of the catalyst components employed were as follows: titanium tetrachloride, 0.5 millimol; triethylaluminium, 1 millimol; and boron trifluoride-phenol complex, 0.25 millimol.

The yield of the polyisoprene having an $[\eta]$ of 5.0 was 58%.

EXAMPLES 10–11

In a similar manner as described in Examples 1–6, a 100-ml. Schlenk-type ampule was charged with 35 ml. of n-hexane, 1.25 millimols (0.5 mol/l. hexane solution) of triethylaluminium, 0.25 millimol (0.2 mol/l. toluene solution) of boron trifluoride-phenol complex, and 0.5 millimol (0.5 mol/l. hexane solution) of titanium tetrachloride, at the temperature indicated below. Thereafter the catalyst was aged for an hour at the same temperatures under vigorous stirring. Then 6.8 g. of isoprene was added thereto, and the melt-sealed ampule was kept at 10° C. for 5 hours to permit the polymerization reaction of the content. The results were as follows:

| | Temperature (° C.) | Yield (percent) | $[\eta]$ |
|---|---|---|---|
| Example Number: | | | |
| 10 | 30 | 72 | 5.0 |
| 11 | 40 | 52 | 5.9 |

EXAMPLE 12

In this example, the polymerization reaction was performed in a similar manner described in Examples 10–11, except that 0.34 g. of isoprene was present during the aging period of the catalyst for 1 hour at 10° C.

The yield of the polyisoprene was 84%, and the polymer had an $[\eta]$ of 5.3.

The high polymerizing activity of the catalyst employed in this example is indeed surprising, since such minor amount of titanium (0.005 mol per mol of isoprene) at such low polymerization temperature as 10° C. for such short reaction period as 5 hours achieved the production of such high molecular weight ($[\eta]=5.3$) polyisoprene at such high yield as 84%.

EXAMPLE 13

A glass autoclave of 3 l. capacity was charged with 1820 ml. of n-hexane, 346.4 g. of isoprene, 43.2 millimols of triethylaluminium (1 mol/l. hexane solution), 9.4 millimols of boron trifluoride-phenol complex (0.5 mol/l. toluene solution), and 24 millimols of titanium tetrachloride (0.5 mol/l. hexane solution), in the order stated, while agitating at 20° C. Then the mixture was reacted at 20° C. for 8 hours. Then a toluene-methanol mixed solvent (volume ratio=7:3) containing 2,6-di-tertbutylphenol as an antioxidant was added to the reaction mixture to stop the polymerization reaction, and the reaction mixture was poured into a large quantity of methanol to precipitate the polymer. The polymer was washed and dried at 40° C. for 24 hours at a reduced pressure. Thus obtained polyisoprene (yield=70%) contained 49% of gel, and had a Mooney viscosity, $ML_{1+4}$ (100° C.), of 88.

EXAMPLE 14

A glass autoclave of 3 l. capacity was charged with 1840 ml. of n-hexane, 48 millimols (2 mols/l. hexane solution) of triethylaluminium, 9.6 millimol (0.5 mol/l. toluene solution) of boron trifluoridephenol complex, and 24 millimols (0.5 mol/l. hexane solution) of titanium tetrachloride, in the order stated, while agitating at 30° C. The mixture was aged for an hour at 30° C. Then 346.4 g. of isoprene was added thereto, followed by 3 hours' polymerization reaction at 10° C. and additional 3 hours' polymerization reaction at 15° C. The termination of polymerization reaction and the subsequent treatments were performed similarly as in Example 13.

The polyisoprene thus obtained at an yield of 84% had a Mooney viscosity $ML_{1+4}$ (100° C.) of 94 and a gel content of 3%.

EXAMPLE 15

A glass autoclave of 3 l. capacity was charged with 1820 ml. of n-hexane, 5.2 g. of isoprene, 60 millimols (2 mols/l. hexane solution) of triethylaluminium, 12 millimols (0.5 mol/l. toluene solution) of boron trifluoride-phenol complex and 24 millimols (0.5 mol/l. hexane solution) of titanium tetrachloride, in the order stated, at 20° C. The catalyst was aged for an hour at this temperature with stirring. Then 346.4 g. of isoprene was added to the autoclave, and polymerized at 10° C. for 5 hours. The termination of the polymerization and the subsequent treatments were performed in the similar manner described in Example 13.

The polyisoprene thus obtained at an yield of 89% had a Mooney viscosity, $ML_{1+4}$ (100° C.), of 73 and $[\eta]$ of 4.2. Its gel content was 0.9%.

From the Examples 13 to 15 it can be understood that by varying the preparation conditions of the catalyst, particularly the presence of isoprene during the catalyst preparation and if present, the amount of the isoprene, and the aging condition of the catalyst, the gel-forming function of the catalyst can be varied over a wide range, however without affecting the desirable high polymerizing activity.

EXAMPLES 16–18

In these examples, isoprene was polymerized with the same manner as in Example 1 except that boron trifluoride-meta-cresol complex ($BF_3 \cdot 1 \cdot 65C_7H_7OH$) was used instead of $BF_3 \cdot 2C_6H_5OH$ and the Al/B molar ratio was varied as shown below.

| | Al/B, molar ratio | Al/Ti, molar ratio | Yield (percent) | $[\eta]$ | Gel (percent) |
|---|---|---|---|---|---|
| Example Number: | | | | | |
| 16 | 3 | 1 | 70 | 3.2 | 1 |
| 17 | 5 | 1 | 68 | 3.2 | 2 |
| 18 | 7 | 1 | 69 | 3.1 | 1 |

We claim:
1. Process for the preparation of a high molecular weight cis-1,4-polyisoprene, which comprises contacting isoprene in a hydrocarbon solvent with a catalyst which is obtained by admixing (A) a titanium tetrahalide, (B) a complex of boron trifluoride with a phenol, and (C) a trialkylaluminium.

2. Process for the preparation of a high molecular weight cis-1,4-polyisoprene which comprises contacting isoprene in a hydrocarbon solvent with a catalyst which is obtained by adding (A) a titanium tetrahalide to a reaction mixture of (B a complex of boron) trifluoride and a mononucleus monohydric phenol with (C) a trialkyl-aluminium, the proportions of the three catalyst components being such that the molar ratio of Ti to Al is from 1:0.5 to 1:10, and the molar ratio of Al to B is from 3:1 to 15:1.

3. The process of claim 2, in which the catalyst in prepared in the presence of isoprene in an amount of up to ten molar times that of the titanium tetrahalide employed.

4. The process of claim 2, in which the mononucleus monohydric phenol is phenol.

References Cited

UNITED STATES PATENTS 2,922,782   1/1960   Hay _____ 260—94.9
3,196,116   7/1965   Klopfer et al. _____ 252—429

JOSEPH L. SCHOFER, Primary Examiner

R. A. GAITHER, Assistant Examiner